June 19, 1934.  J. P. KELLY  1,963,623
VALVE FOR TRAIN STOP SYSTEMS
Filed July 16, 1928  4 Sheets-Sheet 3
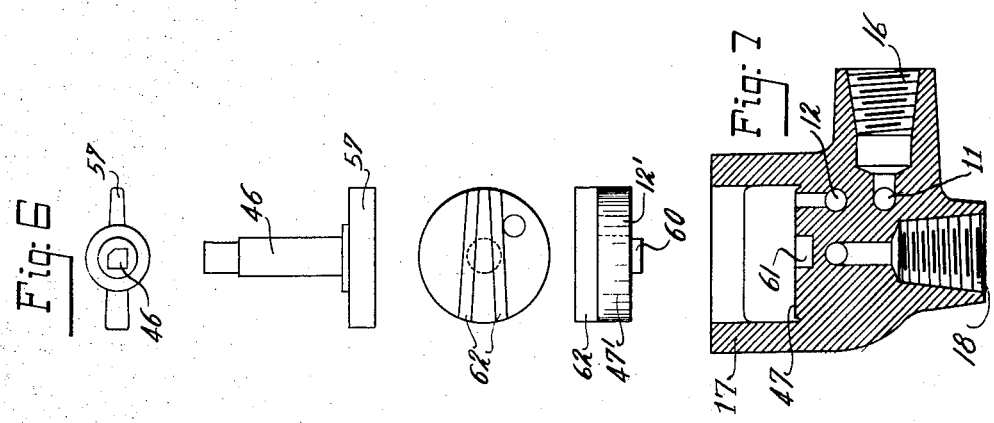
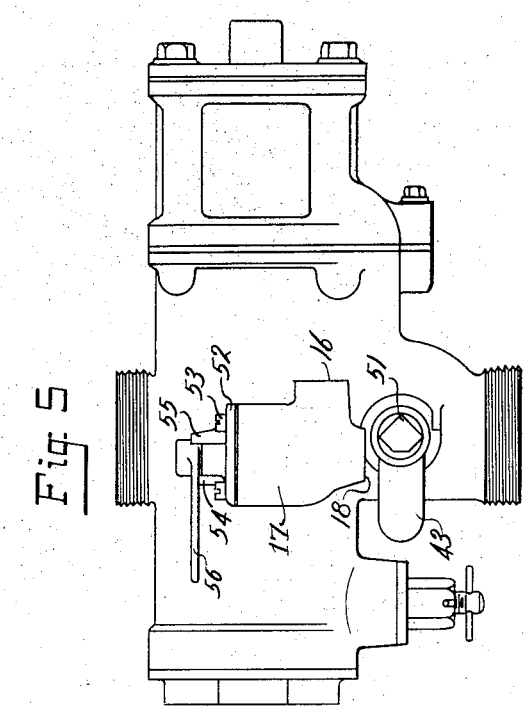
Inventor
John P. Kelly

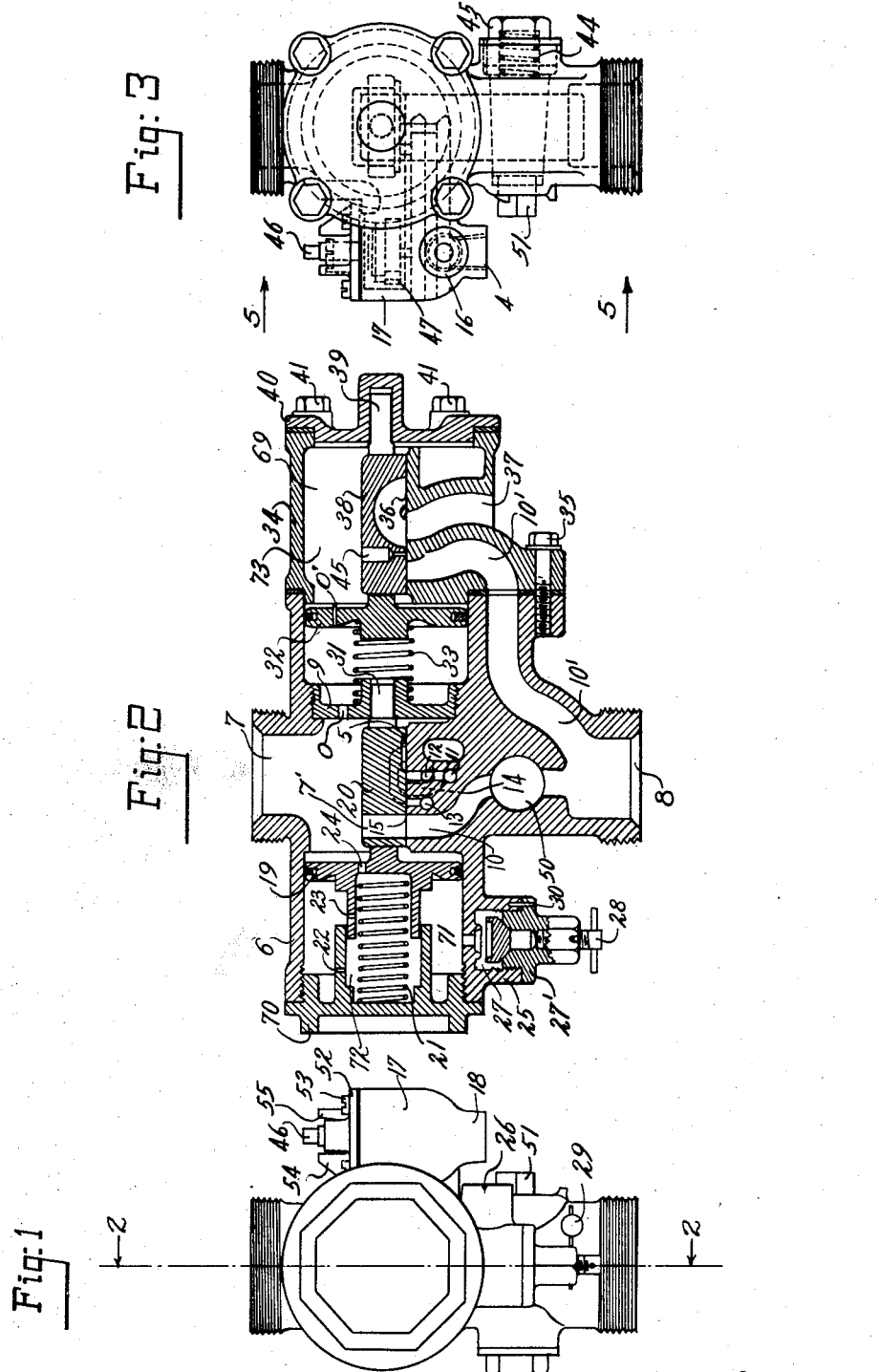

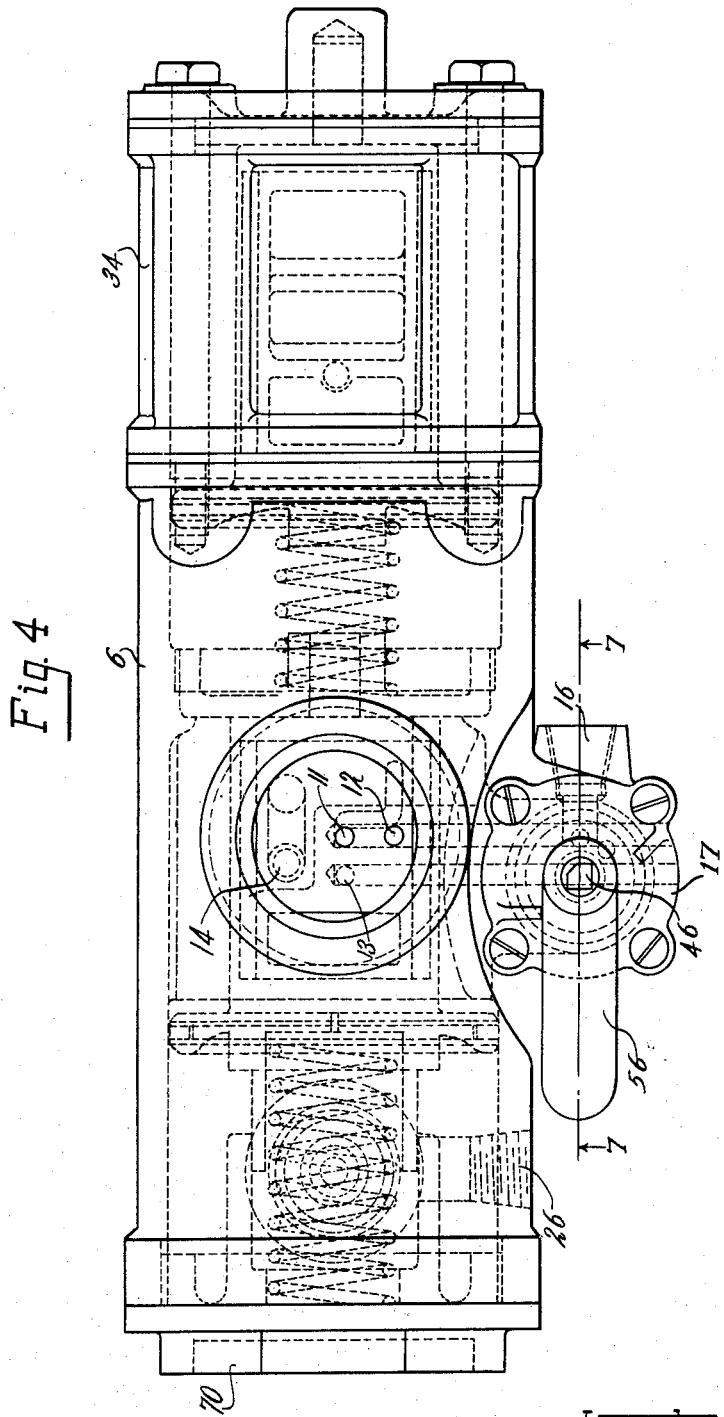

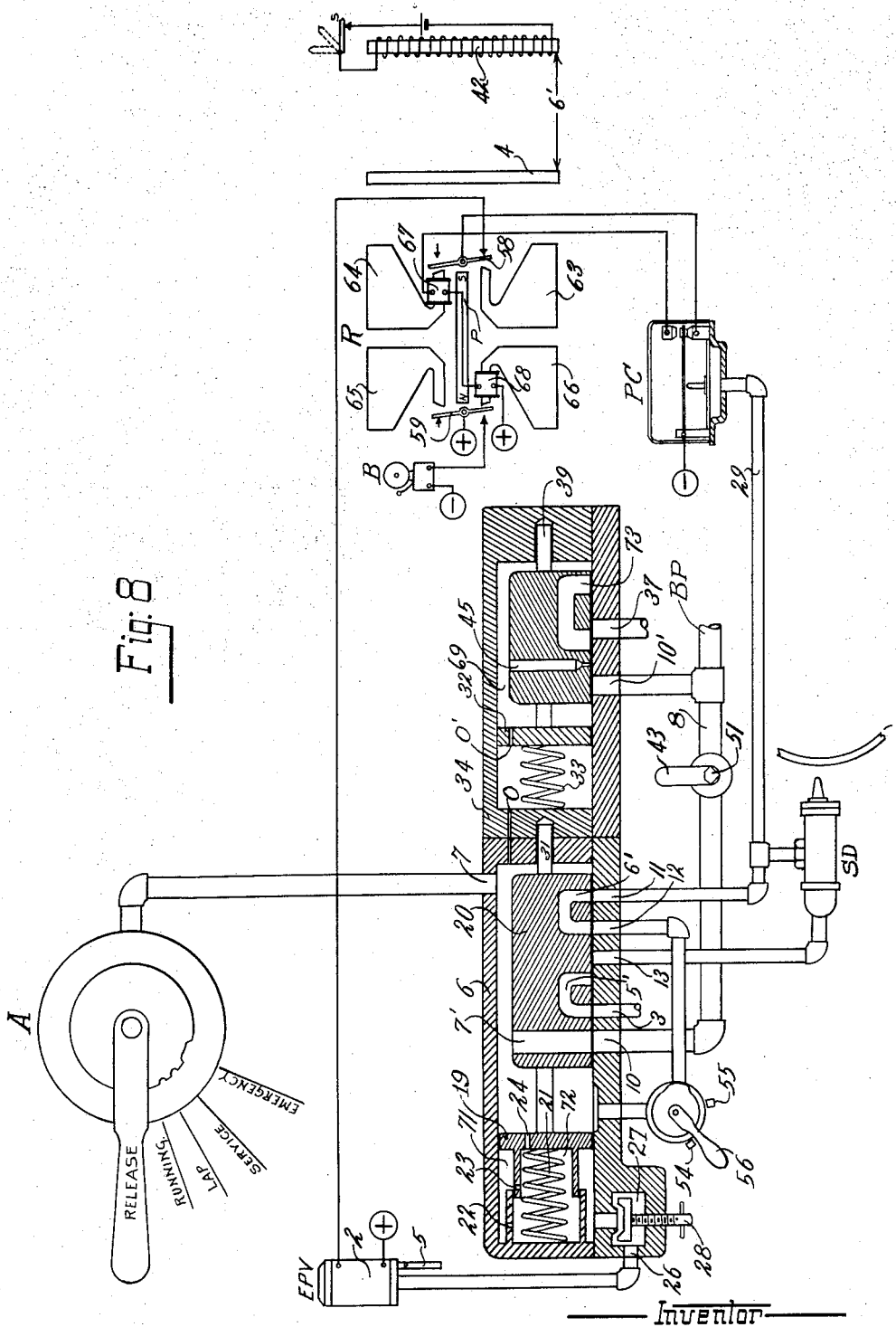

Patented June 19, 1934

1,963,623

UNITED STATES PATENT OFFICE 1,963,623

VALVE FOR TRAIN STOP SYSTEMS

John P. Kelly, Pittsfield, Mass., assignor, by mesne assignments, to Associated Electric Laboratories, Inc., Chicago, Ill., a corporation of Delaware Application July 16, 1928, Serial No. 292,996

12 Claims. (Cl. 303—18)

The present invention relates in general to valves for train stop systems, but is particularly concerned with the provision of a valve structure for this purpose which may be interposed in the pipe connection extending from the brake applicator valve to the brake pipe.

An object of the invention is to provide a relatively simple valve structure which may be used to obtain an automatic brake application in a train stop system and which will also accomplish various other results much desired.

Another object is to provide a valve which can be installed and will operate successfully irrespective of the type of brake applicator valve being used.

Still another object is to provide an automatic brake valve having a double-heading cock incorporated in it together with means for guarding against accidents which might otherwise occur when the double-heading cock is closed.

The brake valve contains other desirable features not specifically mentioned, but which will be brought out as the description progresses.

The structural details of the brake valve are disclosed in three sheets of drawings comprising Fig. 1 to 7, while the application of the valve is illustrated in a fourth sheet identified as Fig. 8.

Fig. 1 is an end view, in elevation showing the general outlines of the brake valve; Fig. 2 is a sectional view taken on line 2—2 of Fig. 1. Fig. 3 is an end view in elevation with the mechanism shown by interrupted lines and is the end opposite to that shown in Fig. 1; Fig. 4 is a top view of the valve with the mechanism shown by interrupted lines. Fig. 5 is a side view in elevation showing the general outline as seen from arrows 5—5 which are near Fig. 3; Fig. 6 shows details of the valve mechanism; Fig. 7 is a cross section of a small portion of the valve taken on section line 7—7 Fig. 4; while in Fig. 8 the valve is shown diagrammatically in connection with a simplified train stop system.

Referring particularly to Fig. 2, it will be seen that the brake valve is designed with a main body 6 in the form of a cross, having a threaded opening 7 for connection with the brake applicator pipe and a threaded opening 8 for connection with the brake line. Inside the valve body a number of ports 10—14 inclusive, are provided all of which extend from a milled surface, forming a slide valve seat, 15. The port 10 connects with the opening 8 and has a branch 10' connecting with another portion of the valve, which will subsequently be described. The port 11 extends downward a short distance from seat 15 and then makes a right angle turn and terminates in the outlet 16, shown in Figs. 3, 4, 5 and 7. The port 12, extends downward a slight distance from the seat 15 makes a right angle turn and extends into an acknowledging valve housing comprising part 17, of the valve body. In this part of the valve body the port 12 extends vertically upward and terminates in a rotary slide valve seat 47, see Figs. 3 and 7. The port 13, extending from a point to the left of port 12 with reference to Figs. 3 and 4, makes a right angle turn and extends to and terminates in the opening 18 extending from the bottom of the part 17 shown in Figs. 1, 4, 5 and 7. The port 14, above and lying at a point between ports 11 and 12 simply extends to the outer surface of the valve and connects with atmosphere.

We will now consider the mechanism and various parts which are connected to the main body, 6, of the brake valve to make the assembly complete. Again considering particularly Fig. 2, it will be noted that the left portion of the body 6 forms a cylinder in which is mounted a service brake applying piston 19 having connected to the right thereof a slide valve member 20 which lies against the valve seat 15 of the valve body. Connected with the left part of the piston 19 is a cup-like member containing a compression spring 21. The spring 21 and the piston 19 are held in place by a cap nut 70 which, when in place forms an air chamber 71 between it and the piston 19. A secondary chamber 72 is also formed by the sleeve extension of the cap nut 70 and by the cup like extension of the piston 19. The orifices 22 and 23 connect these chambers, while an orifice 24 connects the secondary chamber 72 with the opening 7. Immediately below and forming a part of the chamber 71 is an extended portion 25 of the valve body 6 having an outlet 26 shown in Figs. 1, 4 and 8, for connecting with an electro-pneumatic valve used in an automatic train stop system. A second outlet 25 is provided to receive a unit 27' provided with a cutout valve member 28. The unit 27' is screwed into place and locked with a key 30 so that the assembly cannot be removed, and because of a seal 29, Fig. 1, the valve cannot be closed unless the seal is broken.

Referring now to the other portion of the valve member, a plug 9 serves as a bearing for the shaft 31 carrying the valve member 20 and as a stop for an emergency piston return spring 33. The right portion of the valve body, contains an emergency brake application piston 32. This piston is designed to be held to the right, by the lightly tensioned spring 33 resting against the piston and against the plug 9. Secondary valve body member 34 is held against the right portion of the main body valve 6 by a number of cap screws 35 and 41. The member 34 has a port 10' which connects with the port 10 of the main valve body member 6 and terminates in a slide valve seat 36. The member 34 has a second port 37 which has one end terminating in the slide valve seat 36 and its other end open to atmosphere. A slide valve member 38 is attached to the right of the piston 32 and cooperates with the ports terminating in the valve seat 36. The right end of the extension member 34 is closed up with a cap 40 which is maintained in place by the cap screws 41. This cap also contains a bearing for the shaft 39 which assists in maintaining the valve member 38 and piston 32 in proper alignment.

Referring again to the main body 6 of the valve, it will be noted an opening 50 at right angles to the port 10 extends through the lower portion of the valve body. By examining Figs. 1, 3 and 5 it will be found that this opening is provided with a tapered valve member having a shaft 51 extending to the outside of the valve body 6 for receiving a handle 43. A nut 45' and spring 44 are used to hold this valve on its seat under the tension of spring 44. This valve it may be mentioned takes the place of the double heading cock ordinarily used.

Special attention is now directed to the inner parts of and mechanism associated with the part 17 of the valve body. This is best shown in Figs. 3, 6 and 7. The bottom of the cup like portion of the part 17, in which the previously described port terminates is in the form of a rotary slide valve seat, and within this cup is mounted an assembly such as shown in Fig. 6. This comprises a rotary slide valve member 47' provided with a port 12' for connecting the upper part of 17 to the port 12. The slide valve member 47' is also provided with a boss 60 which fits into the depression 61 of part 17, shown in Fig. 7, and serves as an axis on which the valve turns on its seat. A pair of vanes 62 on top of member 47' are so located with respect to each other that they form a wedge-like opening, for receiving a wedge member 57 secured to the valve operating shaft 46. The shaft 46 and valve member are held in place in the part 17 by a cover 52 which is held in place by a number of screws 53. The cover 52 is also provided with extensions 54 and 55 which serve as stops for an acknowledging handle 56 secured to the shaft 46. The perforation 12' in the valve member 47' is brought into alignment with port 12 whenever the handle 56 is rotated counter clock-wise to stop 55.

Attention is now directed to Fig. 8 which, as previously mentioned, diagrammatically illustrates the valve assembly in cooperation with the equipment and circuits of a simplified train stop system, and with the customary brake applicator A. This figure also diagrammatically illustrates the trackway magnets which control the functioning of the train stop equipment which includes the brake valve mechanism.

Since the valve assembly contains a double-heading cock, the one ordinarily provided, it is assumed, has been removed and the entire brake valve assembly simply inserted in its place. With the brake applicator handle in the release or in the running position, as shown, air supply for holding the brakes released passes through the applicator A, into opening 7 of the valve, through the passage 7' of the slide valve member, and thence into the brake pipe via opening 8. Owing to the orifice 24 in piston 19 and because of the orifices 22 and 23 brake pipe pressure is also built up in chambers 71 and 72. Also because of the orifices 0 and 0' in plug 9 Fig. 2, and piston 32 brake pipe pressure is built on both sides of the piston 32. The springs 21 and 33 are therefore normally effective to hold the pistons 19 and 32 to the right in the position in which they are shown.

The vehicle equipment for controlling the valve mechanism in the present illustration consists of an electro-pneumatic valve EPV having a magnet 2, which when deenergized permits air to escape from the chambers 72 and 71, through a warning whistle 5. The valve 2 is normally maintained energized over a circuit including the break contacts of pneumatic contactor PC and the armature 58 and contact of a polarized magnetic pick-up relay R. This relay simply consists of pole pieces 63 and 64 which are normally polarized by the S pole of a small permanent magnet P; of the pole pieces 65 and 66 which are polarized by the N pole of this magnet; of armatures 58 and 59; and of a pair of armature restoring coils 67 and 68. It will be obvious that the normal magnetic circuits are such that the armatures 58 and 59 are magnetically biased, due to the presence of the magnet P, to either of their associated pole pieces to which they have been attracted. This relay is adapted to be suspended from a vehicle of a train so that it is brought into the magnetic field of a pair of trackway magnets 4 and 42 at the exit end of each block. The polarity of the magnet 4 is such that it causes the armatures 58 and 59 to rotate in a clockwise direction to open the circuits of magnet 2 and bell B, while the polarity of the magnet 42, when energized, is such that it will rotate these armatures in a counter-clockwise direction to close these circuits.

A pneumatic contactor PC is provided to complete a circuit thru the armature restoring coils 67 and 68 in case the electro-magnet trackway element is deenergized when the receiver relay R passes thereover. This pneumatic contactor is supplied with air for operating it thru a pipe 29 connected with outlet 16 of the valve assembly.

A branch of the pipe 29 also connects with the exhaust side of a stop detector SD of the type disclosed in the pending Hudd application Serial No. 274,412 filed May 2, 1928. This device consists of a valve mechanism which, when air is supplied to it, it has a part which cooperates with a wheel of the vehicle in such a manner that only if the wheel is stationary can the air supply pass on thru the exhaust opening of the device. The intake of the stop detector is connected with outlet 18 of the valve mechanism.

The operation of the valve when used in the train stop system shown will now be described in detail.

When a train approaches the exit of a block the armature 58 breaks the circuit of the electro-pneumatic valve magnet 2, which releases and causes air to exhaust from chambers 71 and 72 through the whistle 5. The armature 59 at the same time, at its lower contact completes the circuit of the bell B. Air exhausts thru the outlet 26 and whistle 5 at a greater rate than brake pipe air is permitted to enter chamber 71 thru orifices 24, 23 and 22. Consequently, after the pressure in chambers 71 and 72 falls to a point where the pressure upon the right hand side of the service application piston 19 is sufficient to overcome the spring 21 in chamber 72 (approximated six seconds, as designed) the service brake application piston 19 will begin to move and will first close orifice 23. With the orifice 23 closed the air supply to chamber 71 will be greatly reduced and the piston 19 with the service application valve member 20 will move to the extreme left. The valve member in moving to the left cuts off the air supply from port 10 and connects this port, extending through the double-heading cock, to atmosphere, via the bypass 5' to the service exhaust port 3, thus causing an automatic service brake application to take place. The engineer is powerless to release the brakes until the slide member 20 is restored to the position shown.

If the engineer is alert he can forestall the automatic brake application by operating and restoring the acknowledging lever 56 before the expiration of the six second interval. The operation of the acknowledging lever, before appreciable movement of valve member 20 has occurred, permits air to pass from the main body of the valve, thru the acknowledging valve, into port 12 via by-pass 6' of member 20 and port 11 which is connected to the pneumatic contactor PC via pipe 29. The pneumatic contactor therefore operates and, in so doing, at its armature 58 opens a second point in the traced circuit of magnet 2 and closes the circuit of the armature restoring coils 67 and 68 of relay R, which circuit includes the upper contacts of PC. The armature 58 therefore operates and again closes a point in the circuit of the EPV magnet 2; while armature 59 opens the circuit of the bell B.

The silencing of the bell serves to notify the engineer that the acknowledging action has been fully accomplished and that the acknowledging lever must be immediately restored so that the circuit of magnet 2, can again be completed at the pneumatic contactor contacts. The effect of the reenergizing of the magnet 2 is to prevent further exhaust of air from the chamber 71 and in the silencing of the whistle 5. Normal brake pipe pressure is therefore again established in the chamber 71.

After the brakes have once been applied, operation of the acknowledging lever 56 will be without effect until after the train has been brought to a stop. When the train is at a standstill the operation of the acknowledging lever will result in air being supplied to the pneumatic contactor PC via the acknowledging valve, by-pass 6', ports 12 and 13, the stop detector SD and pipe 29. Following the restoration of the acknowledging lever the EPV magnet 2 will again energize and as soon as brake pipe pressure is again built up in chamber 72 the spring 21 will start to restore the piston 19 and valve member 20 to their normal position. As soon as piston 19 moves slightly to the right, port 22 is uncovered and, as pressure also builds up in chamber 71, the valve fully restores.

If the signal S is at "clear", an instant after the permanent magnet is encountered the energized electro-magnet element is encountered and is effective to restore the armatures 58 and 59 to their initial positions. The circuits for the electro-pneumatic valve magnet 2 and bell B are therefore again completed, and the whistle and bell both cease operation. The effect of passing over these magnets therefore, under the circumstances assumed will cause the warning whistle and bell to actuate only momentarily, thereby notifying the engineer that the vehicle has passed a "proceed" signal and acknowledgement is unnecessary.

If the train has arrived at the exit of a block in which the signal S is in its "caution", or "stop" position, the receiver R passes over the permanent magnet 4 causing the first described circuit changes to again take place. However, since the electro-magnet 42 is deenergized at this time, the circuit condition brought about by magnet 4 will remain unchanged. Consequently the electro-pneumatic valve 2 will remain deenergized and the warning whistle 5 and bell B will continue to actuate. Acknowledging action on the part of the engineer within the six second period will be necessary in order to avoid an automatic brake application occurring.

In the braking systems generally in use serious accidents have occurred due to failure to open or because of accidental closing of the double-heading cock. In double-heading it is customary to place the double-heading cock of the double-headed locomotive in its closed position, thereby placing the control of the train solely in the hands of the enginemen of the head locomotive.

In order to guard against accidents which might occur consequent to the double-heading cock being closed for any reason, applicant has included the double-heading cock in the brake valve assembly and has arranged a by-pass around this cock which will be automatically opened when the applicator handle is moved into emergency position, so that an engineman may, in an emergency, apply the brakes even though the double-heading cock of his locomotive is closed. The operation is as follows:

It will first be assumed that an engineman of a double headed locomotive finds occasion for applying the brakes in emergency. Since the double-heading cock of the locomotive is closed this can only be accomplished by movement of the brake applicator handle to emergency position. The movement of the brake applicator handle to emergency position, in the well known manner, ordinarily quickly exhausts the air from the brake pipe thru a port opened in the brake applicator valve. However, since, under the circumstances assumed, the double-heading cock is closed and therefore, owing to the small air capacity in the space above slide member 20 and in the space between plug 9 and piston 32, a quick drop in the pressure in the upper part of the brake valve only at first occurs. This permits the air in chamber 69 to rapidly expand and cause the emergency application piston 32 to move to the left a distance at least sufficient to bring the port 45 of the slide valve member 38 over the port 10'. Air from the brake pipe supplied to the piston 32 through port 45 assisted by the continuation in the drop pressure on the left side of the piston now quickly forces the piston to the extreme left. With the piston 32 in this position the brake pipe BP is connected to atmosphere via port 10', the by-pass 73 of the valve member 38, and emergency port 37. This results in an emergency application.

It may also sometimes occur that, following an automatic brake application, an engineman desires to make an emergency, or acceleration of the brake application. He may do this by simply moving the brake applicator handle to emergency position as hereinbefore described. Since at this time the slide valve member 20 is at its extreme left the applicator is cut off from the brake line just the same as if the double-heading cock is closed and the same operation of the piston 32 is brought about. The piston 32, however, is not operated by movement of the applicator valve to emergency position when the slide valve 20 is in its release position unless the double heading cock is closed, as under such circumstances owing to the capacity of the connected brake pipe BP the required quick drop in pressure is not obtained.

It will be obvious therefore that although the engineman cannot release the brakes following an automatic application he can accelerate an automatic application, or can cause an application at will irrespective of the position of the double-heading cock.

If at any time it is necessary or desirable to cut out the use of the brake valve and its associated equipment, this may be done by breaking the seal 29 and closing the cut-out valve 28, thereby preventing the exhaust of air from chambers 71 and 72 occurring upon the deenergization of magnet 2.

What is claimed is:

1. In a valve structure for use in a train stop system, a unit structure including pneumatically operable means for initiating service and emergency brake applications, a double-heading cock within said valve and means for permitting the emergency brake application means to function irrespective of the open or closed condition of said double-heading cock.

2. In a valve structure for use in automatic train stop systems, a valve for initiating an automatic brake application, a pneumatic timing device for delaying the operation of said valve, and a manually operable valve effective if operated during said delay for preventing the initiation of a brake application and effective to release an initiated brake application only if operated after the train has been brought to a stop.

3. In a brake valve structure, a service brake application piston, a spring for normally maintaining said piston in a brake release position, ports thru which air pressure may normally be supplied to both sides of said piston, the air supply to one side being supplied thru restricted openings, another opening via which air may pass to atmosphere from the last mentioned side of the piston at a greater rate than it can be replaced thru said restricted openings, and means operated by a slight movement of said piston for further restricting one of said restricted openings to then immediately bring about such a great difference in pressure on the opposite sides of said piston to cause the same to move to its alternate or brake applying position.

4. In a brake valve structure for use on air brake systems, a brake control piston, restricted and non restricted openings thru which air may be supplied to both sides of said piston, means for normally maintaining said piston in its release position while the air pressure on each side thereof is the same and means operated by said piston to initiate an emergency brake application responsive to the connection of one side of said piston to atmosphere.

5. In a brake valve structure, a slide valve having a plurality of exhaust ports and operable by compressed air to initiate a brake application, a manually operable rotary valve having intake and exhaust ports respectively and air connections between the exhaust ports of said slide and rotary valves for causing air supplied to said rotary valve to pass thru one or the other of said slide valve exhaust ports depending on the position of said slide valve at the time said rotary valve is actuated.

6. In a brake valve structure for use in a train stop system, a double-heading cock permitting the brake valve structure to be substituted as a unit for the ordinarily provided double-heading cock of a locomotive brake located in the pipe connecting the brake applicator with the brake pipe and other mechanism for control by a train stop system for causing an automatic brake application to be initiated.

7. In a brake valve, a cylinder having openings for connection with a brake applicator valve and brake pipe, respectively, a piston in said cylinder having a passageway therethrough to permit air in said cylinder to equalize on both sides of said piston, a valve member operable by said piston to open and close one of said openings, a spring for maintaining said piston and valve member in position to hold said openings open to each other when the pressure on both sides of said piston is equalized, and means for unbalancing the pressure to cause the operation of said piston pneumatically to close said openings to each other.

8. In combination with a manually operable rotary valve having intake and exhaust ports respectively, a slide valve having an exhaust port, and means operative or not consequent to the opening of the exhaust port of the first valve to open the exhaust port of the slide valve or not depending on the position of said slide valve.

9. In a braking system, a casing having two openings therein one of which is connected with a brake pipe, said casing also having a passageway between the openings, pneumatically operable means within said casing for closing the passageway; a brake applicator valve connected with the other of the openings, operable at will to connect the opening with which it is connected to atmosphere; and pneumatic means operated consequent to the actuation of said brake applicator valve, at a time when the passageway is closed, to connect the opening to which the brake pipe is connected to atmosphere via a path excluding the opening with which the applicator valve is connected.

10. In a braking system, a casing having two openings therein one of which is connected with a brake pipe, said casing also having a passageway between the openings, pneumatically operable means within said casing for closing the passageway; a brake applicator valve connected to the other opening, manually operable means for also preventing the passing of fluid pressure between the brake pipe and the passageway, and pneumatic means operated consequent to the actuation of said brake applicator valve, at a time when the passageway is closed and the manually operable means is operated, to connect the opening to which the brake pipe is connected to atmosphere via a path excluding the opening to which the applicator valve is connected.

11. In a brake valve for use in connection with a train stop system, a service brake application piston, an emergency brake application piston, a slide valve operable by the first piston while the said emergency piston is in its normal or release position, manual means operable to prevent the movement of said service piston from effecting a service brake application; a second slide valve operable by the second piston only while the first piston is in its operated position when the manual means is in normal position, but operable irrespective of the position of the first piston providing said manual means is in its operated position.

12. In a braking system equipped with an applicator valve and with a brake valve of the character specified in the preceding claim, characterized in this, that the movement of the second piston is controlled by the applicator valve.

JOHN P. KELLY.